US010104711B2

United States Patent
Moeller

(10) Patent No.: US 10,104,711 B2
(45) Date of Patent: *Oct. 16, 2018

(54) MOBILE ROUTER WITH SESSION PROXY

(71) Applicant: LEAR CORPORATION, Southfield, MI (US)

(72) Inventor: Douglas S Moeller, Santa Rosa, CA (US)

(73) Assignee: LEAR CORPORATION, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,847

(22) Filed: Feb. 21, 2017

(65) Prior Publication Data

US 2017/0359847 A1 Dec. 14, 2017

Related U.S. Application Data

(63) Continuation of application No. 15/180,304, filed on Jun. 13, 2016, now Pat. No. 9,578,672.

(51) Int. Cl.
*H04W 76/19* (2018.01)
*H04W 76/18* (2018.01)
(Continued)

(52) U.S. Cl.
CPC ......... *H04W 76/19* (2018.02); *H04L 12/2856* (2013.01); *H04L 12/66* (2013.01); *H04L 43/50* (2013.01); *H04L 67/28* (2013.01); *H04L 67/2861* (2013.01); *H04L 69/40* (2013.01); *H04W 24/08* (2013.01); *H04W 76/18* (2018.02); *H04W 76/25* (2018.02); *H04W 84/005* (2013.01); *H04W 84/042* (2013.01);
(Continued)

(58) Field of Classification Search
CPC ... H04W 76/19; H04W 24/08; H04W 76/028; H04L 43/50
See application file for complete search history.

(56) References Cited

U.S. PATENT DOCUMENTS 7,346,025 B2* 3/2008 Bryson .................. H04L 29/00
370/328
2005/0102529 A1* 5/2005 Buddhikot .............. H04L 63/02
726/26
(Continued)

*Primary Examiner* — Un C Cho
*Assistant Examiner* — Jeremy Costin
(74) *Attorney, Agent, or Firm* — Donald J Lenkszus

(57) ABSTRACT

A non-transitory computer readable medium with computer executable instructions stored thereon executed by a processor in a vehicle comprising a wireless local area network interface to communicate with a mobile device via a local wireless network and a backhaul network interface to wirelessly communicate with a backhaul network and to establish a layer 2 communication link and a layer 3 communication link to provide a link monitoring communication method. The method comprises: monitoring the layer 2 communication link and the layer 3 communication links over the backhaul network interface; reestablishing communications via the layer 2 communication link and the layer 3 communication link when a communications failure via the layer 2 communications link is detected; and reestablishing communications via the layer 3 communication link when a communications failure via only the layer 3 communication link is detected.

16 Claims, 3 Drawing Sheets

(51) Int. Cl.
*H04L 12/66* (2006.01)
*H04L 12/26* (2006.01)
*H04W 24/08* (2009.01)
*H04W 76/25* (2018.01)
*H04L 12/28* (2006.01)
*H04L 29/08* (2006.01)
*H04L 29/14* (2006.01)
*H04W 84/00* (2009.01)
*H04W 84/12* (2009.01)
*H04W 88/10* (2009.01)
*H04W 88/16* (2009.01)
*H04W 84/04* (2009.01)

(52) U.S. Cl.
CPC ............ *H04W 84/12* (2013.01); *H04W 88/10* (2013.01); *H04W 88/16* (2013.01)

(56) References Cited

U.S. PATENT DOCUMENTS

| | | | |
|---|---|---|---|
| 2005/0181792 A1* | 8/2005 | Kobayashi | H04W 48/18 455/435.2 |
| 2008/0186897 A1* | 8/2008 | Rune | H04L 12/4633 370/315 |
| 2009/0219900 A1* | 9/2009 | Kokkinen | B61L 15/0027 370/338 |

\* cited by examiner

MOBILE ROUTER WITH SESSION PROXY

CROSS-REFERENCE TO RELATED APPLICATIONS

The present application is a continuation of U.S. Ser. No. 15/180,304 filed Jun. 13, 2016 which is a continuation of U.S. Ser. No. 14/448,810 filed Jul. 31, 2014 which is a continuation of U.S. Ser. No. 12/514,047 filed May 15, 2007 that claims priority to PCT/US07/11632 filed May 7, 2009 that claims priority to the following U.S. provisional applications:

(1) U.S. provisional application Ser. No. 60/800,749, filed May 16, 2006, entitled "Mobile Router That Monitors Links," by Douglas S. Moeller;

(2) U.S. provisional application Ser. No. 60/800,679, filed May 16, 2006, entitled "Mobile Router With Serial Interface," by Douglas S. Moeller; and (3) U.S. provisional application Ser. No. 60/800,750, filed May 16, 2006, entitled "Mobile Router With Session Proxy," by Douglas S. Moeller.

The present application is related to the following PCT applications:

(1) PCT application entitled "Mobile Router That Monitors Links," by Douglas S. Moeller, now U.S. Pat. No. 8,189,552; and (2) PCT application entitled "Mobile Router With Serial Interface," by Douglas S. Moeller, now U.S. Pat. No. 8,072,994.

BACKGROUND

Many people use mobile or wireless end-user computer-type devices for a variety of purposes. These devices include smartphones, handheld computer-type devices, personal digital assistants (PDAs), laptop computers equipped with a wireless network interface card, etc. Users often use such devices to read and write email messages, access the Internet, download and view image or video files, run applications, etc.

In order to use such mobile devices, the mobile devices must be able to connect to a wireless network. Conventional wireless local area networks (WLANs) are often deployed inside structures such as homes, offices, public and commercial buildings, etc. The WLAN typically comprises one or more wireless access points, such as a wireless router or hot spot, which communicates wirelessly with the mobile device, and allows the mobile device to connect to a wired network (or other network) that is also in communication with the access point. In order to stay connected to such WLANs, the mobile user must usually stay with the range of the access points. This often constrains the effective mobility of a wireless user. The mobile user must stay in the home, office or building to have wireless access to the WLAN, but if the mobile user leaves the premises, the mobile user may leave the range of the wireless access points and thereby lose connectivity to the network. For the IEEE 802.11 standard, also known as Wi-Fi, the range of such access points is about 50 meters for indoor environments and 100 meters for outdoor environments.

Some campuses and urban areas provide broader W-Fi coverage areas by placing a number of cooperating Wi-Fi hot spots throughout the campus or urban area. This provides the mobile user with greater wireless access as the mobile user generally can move around the campus/urban area while maintaining wireless connectivity. However, when the mobile user leaves the campus/urban area, the user may lose connectivity, thus constraining the wireless mobility of the user.

This dilemma has been addressed somewhat by cellular networks that allow mobile devices to communicate wireless data with such cellular networks using data communication standards, such as GSM/GPRS (Global System for Mobile Communications/General Packet Radio Service) or EDGE (Enhanced Data rates for GSM Evolution). Such cellular networks generally provide much broader coverage areas than WLANs or Wi-Fi area, so a mobile user will ordinarily have fewer restrictions on mobility when accessing such a cellular network. Further, cellular networks typically can accommodate roaming users by allowing users to stay connected as they travel from one cellular network to another.

Nevertheless, mobile end-user devices often experience interruptions in service due to drop-offs by the network (either Wi-Fi or cellular network). This problem is exacerbated when the user is quickly moving between network cells, hot spots or networks. This can be caused, for example, (i) because the user's wireless access provider/protocol is not compatible with the new cell, hot spot or network, (ii) because the new cell, hot spot or network is overly congested with traffic, (iii) because of faulty hand-off procedures between the cells, hot spots, or networks, or many other reasons.

In addition, a mobile end-user may experience other types of performance problems, including a change of bit rate or bandwidth during the data transmission, and a change in the quality of service (e.g., jitter, latency, data loss, etc.).

Accordingly, there exists a need for a way to alleviate or mitigate the problems experienced by a user of mobile end-user device.

SUMMARY

In one general aspect, the present invention is directed to a mobile router. The mobile router may communication with one or more mobile devices via a local wireless network, such as a Wi-Fi or Wi-MAX network. The mobile router may further act as a gateway for communications from the mobile device to a backhaul network, which also in communication with the mobile router via a wireless communication link. The backhaul network may comprise a cellular network, such as a GSM/GPRS or UTMS network, or some other type of wireless network. The backhaul network may be connected to the Internet or other network (e.g., WAN). That way, the mobile device can communicate with a destination device connected to the Internet (or other network) via the mobile router and the backhaul network.

Further, because the mobile router wirelessly communicates with the backhaul network, it can move with the mobile device as the mobile device moves to provide enhanced mobile wireless connectivity for the mobile device. For example, the mobile router can be installed, affixed or otherwise placed in a vehicle, such as a car, bus, boat, rail car, etc., where the end user of the mobile device is a passenger (or driver). That way, the end user can maintain wireless activity as the user moves about.

According to various embodiments, the mobile router may comprise a session proxy module establishes two transport protocol sessions—one between the mobile router and the mobile device, and one between the mobile router and a destination device—when the end user seeks to communicate with the destination device through the mobile router. That way, if the session between the mobile router and a destination device goes down, the session between the mobile router and the mobile device may remain active, thereby allowing the mobile device to believe that the session is still active while the mobile router works to restore the session. Also, the two sessions may use different protocols. For example, the session between the mobile device and the mobile router may use the TCP protocol, whereas the session between the mobile router and the destination device may use a different protocol, such as HS-TCP or SCPS. Moreover, the establishment of the two sessions by the mobile router may be transparent to the end user. Also, the end user could have the option of disabling the session proxy functionality in certain embodiments. This may be desirable when the end user is using an application that encrypts the TCP headers.

Another potential benefit is that when the backhaul network goes down, the session proxy module may prevent the TCP session for the link to the mobile device 16 from starting its back-off timers. This is advantageous because, under the TCP protocol, the mobile device would normally assume that it cannot forward packets because of network congestion and it would accordingly start to slow down the user's session. In contrast, with the session proxy module maintaining a session between the mobile router and the mobile device that is separate from the session between the mobile router and the backhaul network, the mobile device may not assume that network congestion is a problem and the TCP session between mobile router and the mobile device may not slow down. Another potential benefit is that the TCP timers and congestion windows can be adjusted dynamically so that the link may be optimized for the particular characteristics of the backhaul network (e.g., packet loss, latency jitter, etc.).

In addition, the mobile router may comprise a session link module that monitors the layer 2 and/or layer 3 links of the mobile router with the backhaul network. That way, when the link monitor module detects a drop-off, the link monitor module can reestablish the link as quickly as possible in order to minimize the interruption in service to the end user. According to various embodiments, the link monitor module does this by sending and monitoring test (or probing) data packets over the backhaul wireless communication link. That way, the user does not have to restart his/her applications or sessions. The user just typically notices that the applications/sessions slowed for a brief period of time while the connection was being reestablished.

In addition, according to various embodiments, the mobile router may include a serial data port for communicating with a serial data device connected thereto. In addition, the mobile router may include a serial device data publication module which transmits data from the serial device over the backhaul network to a destination device, such as a server/database, such that remote users could access the database to retrieve the data from the serial device. The serial device could be, for example, a GPS receiver that records location data for the mobile router, or another type of serial data device. In addition, rather than transmitting the data to a server/database, a remote user could access the mobile router to access the data from the serial device directly. Additionally, the serial interface of the mobile router could be used to output data/command signals to the connected serial device.

These and other benefits will be apparent from the description to follow.

FIGURES

Various embodiments of the present invention are described herein by way of example in conjunction with the following figures, wherein.

DESCRIPTION

Figure 1:
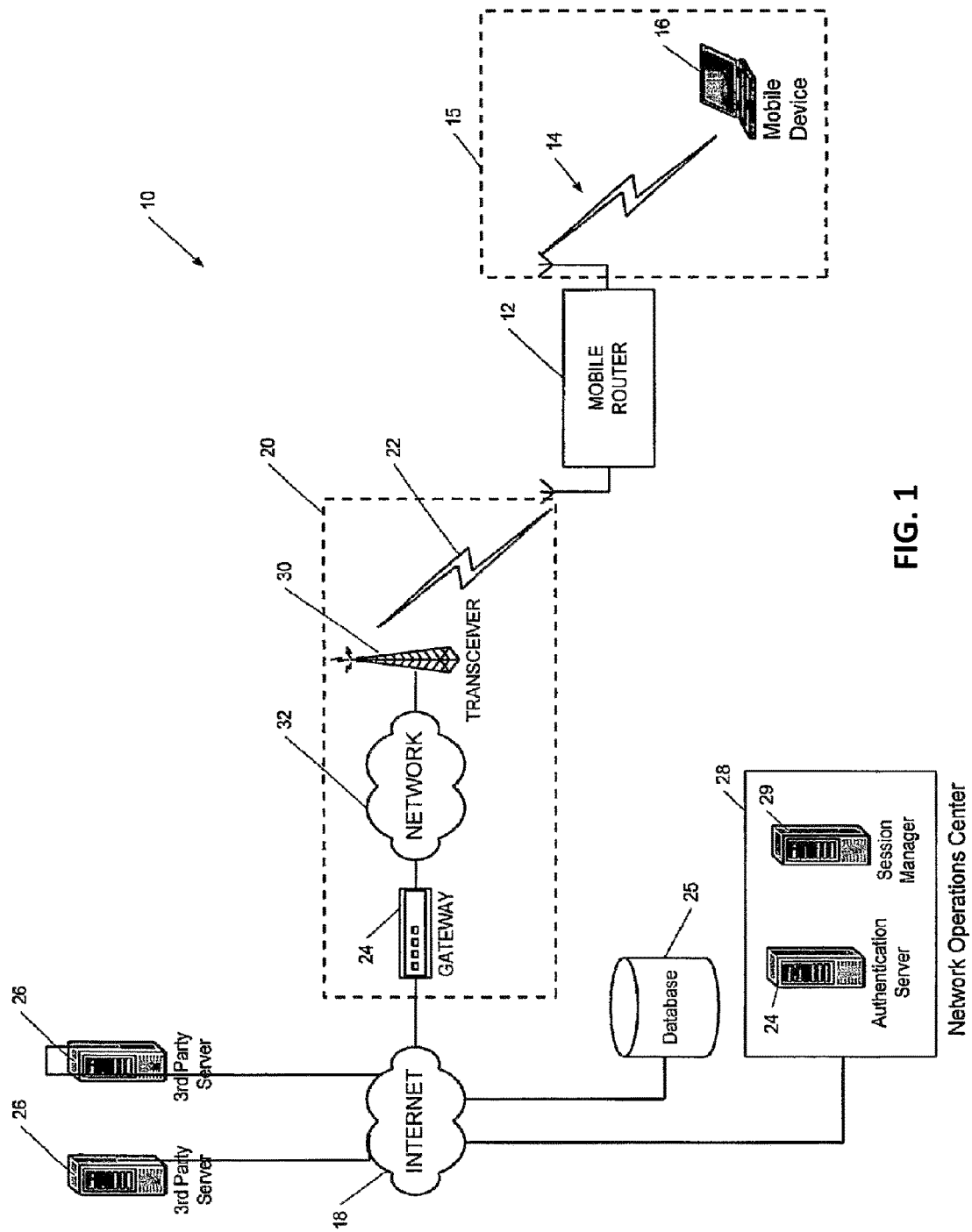
FIG. 1 is a block diagram of a network including a mobile router according to various embodiments of the present invention.

FIG. 1 is a diagram of a network 10 according to various embodiments of the present invention. As shown in FIG. 1, the network 10 comprises a mobile router 12 in communication with a mobile device 16 via a wireless communication link 14 (referred to sometimes hereinafter as the "local wireless communication link 14"). The wireless communication link 14 may be provided as part of the wireless network 15 including the mobile router 12 and the mobile device 16. The wireless network 15 (referred to sometimes hereinafter as the "local wireless network 15") may be, for example, a WiFi network (e.g., IEEE 802.11 network), a WiMAX network (IEEE 802.16), a Bluetooth network, or any other suitable wireless network.

The mobile device 16 may be any computer-based device capable of receiving and transmitting data via the wireless communication link 14. For example, the mobile device 16 may be a laptop (or notebook) computer (as shown in the example of FIG. 1) equipped with a wireless network interface card, a wireless-enabled PDA, a pocket or palmtop computer, a WiFi phone (e.g., a Skype phone or VoIP phone), a WiFi appliance, a Sony PlayStation PSP or some other portable, network-enabled gaming station, a video screen, a digital camera, an audio player, a navigation device, a security camera, an alarm device, a wireless payment or POS device, etc.

The mobile router 12, as explained further hereinbelow, may act as a gateway between the wireless network 15 and a backhaul network 20. The backhaul network 20 in turn may be connected to the Internet 18 or any other network (such as an intranet or another WAN) via a gateway 24.

The mobile router 12 may communicate with the backhaul network 20 via a backhaul wireless communication link 22 (sometimes referred to hereinafter as the "backhaul wireless communication link"). The backhaul wireless communication link 22 may be provided by a wireless network that is part of the backhaul network 20, such as a cellular wireless network. The cellular wireless network may be, for example: a Global System for Mobile Communications/General Packet Radio Service (GSM/GPRS) link; a UMTS (Universal Mobile Telecommunications System) link; a Code Division Multiple Access (CDMA) link; an Evolution-Data Optimized (EV-DO) link; an Enhanced Data Rates for GSM Evolution (EDGE) link; a 3GSM link; a Digital Enhanced Cordless Telecommunications (DECT) link; a Digital AMPS (IS-136/TDMA) link; an Integrated Digital Enhanced Link (iDEN) link; a WiMAX link; or any other suitable wireless link. That way, the mobile router 12 may provide wireless access for the mobile device 16 to the Internet 18 (or other desired network).

According to various embodiments, the mobile router 12 and the mobile device 16 are co-located in a moving vehicle so that mobile router 12 is mobile and so that end-users of the mobile device 16 can enjoy wireless connectivity to the Internet 18 via the mobile router 12 as the vehicle (not shown) moves through cells or nodes associated with the wireless network 22. The moving vehicle could be, for example, a car, a truck, a bus, a boat, a train or rail car, etc. The mobile router 12 may be mounted to the vehicle in a secure and generally tamper-resistant location. For example, the mobile router 12 may be mounted in the trunk of an automobile, and the end-user of the mobile device 16 may be a passenger or driver of the automobile. That way, the end-user could enjoy wireless connectivity as the automobile moves between cells of the wireless network 22.

Also, although only one mobile device 16 is shown in communication with the mobile router 12 in FIG. 1, it should be noted that numerous mobile devices 16 may be in communication with the mobile router 12 via the network 14. For example, in a scenario where the mobile router 12 is routed in an automobile, more than one passenger may be using an end-user mobile device 16 that communicates with the Internet 18 (or some other network) via the mobile router 12 and the backhaul network 20. For example, one passenger could be checking email on a palmtop computer device, while another passenger may be surfing the World Wide Web, etc.

It should also be recognized, however, that the mobile router 12 does not necessarily need to be installed in, affixed to, or otherwise placed in a mobile vehicle. For example, a user could use the mobile router 12 at home, work, or any other stationary location, or carry the mobile router 12 around with him/her.

As shown in FIG. 1, a transceiver 30 may receive and transmit the wireless signals to the mobile router 12 via the wireless communication link 22. A communication network 32 of the backhaul network 20 may communicate with the Internet 18 (or other network) via one or more gateways 24. The communication network 32 may include conventional network elements such as servers, routers, switch, etc., and may provide wireless network service for the mobile router 12. Of course, although only one transceiver 30 is shown in FIG. 1, it should be recognized that the backhaul network 20 may comprise a number of such transceivers, located in different areas serviced by the backhaul network 20, such that the mobile router 12 may stay in communication with the backhaul network 20 as the mobile router 12 moves between cells or nodes of the backhaul network 20.

As shown in FIG. 1, third party servers 26 may be in communication with the Internet (or other network) 18. That way, the mobile device 16 can access the third party servers 26 through the mobile router 12 and the backhaul network 20.

Figure 2:
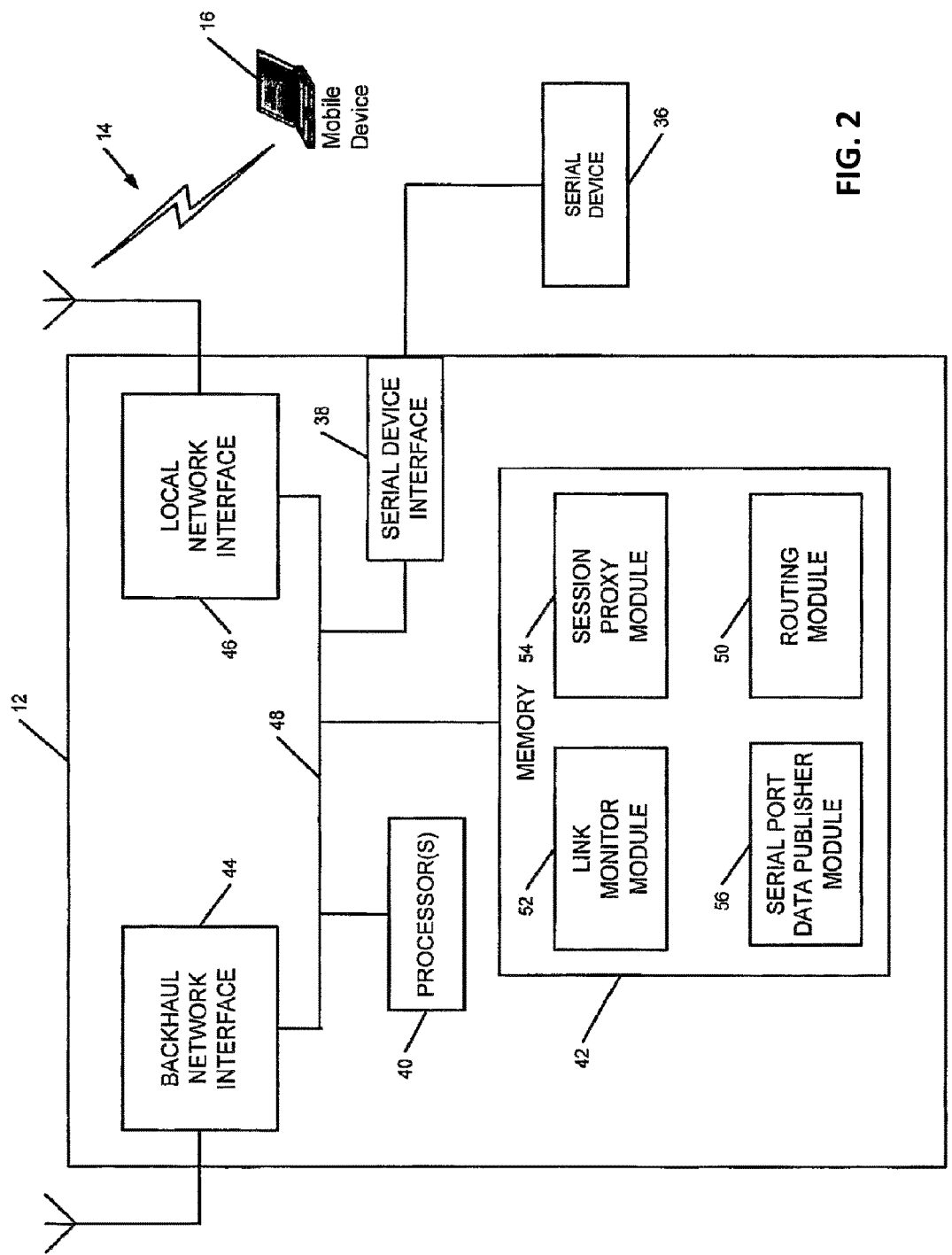
FIG. 2 is a block diagram of a mobile router according to various embodiments of the present invention.

FIG. 2 is a simplified block diagram of the mobile router 12 according to various embodiments of the present invention. As shown in FIG. 2, the mobile router 12 may comprise one or more processors 40, one or more memory units 42, a backhaul network interface 44, and a local network interface 46, that may be connected via a system bus 48.

The backhaul network interface 44 is for interfacing with the backhaul network 20. The local network interface 26 for interfacing with the wireless network 15. The type of backhaul network interface 44 may depend on the types of backhaul wireless communication link 22 used. For example, the backhaul interface network 44 may be a GSM/GPRS interface, a UTMS interface, an EDGE interface, a Wi-MAX interface, etc. Similarly, the type of local network interface 46 may depend on the type of wireless network 15 used. For example, the local network interface 15 may be a Wi-Fi, Wi-MAX, or Bluetooth interface.

The processor(s) 40 may execute instruction code stored in the memory 42. The memory 42 may be embodied as one or more computer-readable media, including Read-Only-Memory (ROM) and/or Random-Access-Memory (RAM). As such, the memory 42 may comprise one or more memory chips, optical memory devices (e.g., CD-ROM), magnetic memory devices (e.g., disk drives), etc. The memory 42 may include a number of software modules, including a routing module 50, a link monitor module 52, a session proxy module 54 and a serial port data publisher module 56, that may be implemented as software code to be executed by the processor(s) using any suitable computer instruction type. The software code may be stored as a series of instructions or commands, or as a program, in the memory 42.

The routing module 50 may include the code for allowing the mobile router 12 to route data packets from the wireless network 15 to the backhaul network 20, and vice versa, as is known in the art. The link monitor module 52, as explained further below, may monitor the layer 2 (data link or cellular layer) and layer 3 (IP or network layer) links of the mobile router 12 with the backhaul network 20 by sending test or probing data packets. By monitoring the packets, the link monitor module 52 can detect if either (or both) of the links fails. That way, the mobile router 12 can take appropriate action when one of the links fails.

According to various embodiments, both the local wireless communication link 14 and the backhaul wireless communication link 22 may use the TCP (Transmission Control Protocol) transport protocol for the session layer of the network protocols. TCP is one of the core protocols of the Internet protocol suite, often simply referred to as "TCP/IP." Using TCP, applications on networked hosts can create connections to one another, over which they can exchange streams of data using stream sockets. Stream sockets are a type of internet socket which provides a connection-oriented, sequenced, and unduplicated flow of data without record boundaries. The TCP protocol guarantees reliable and in-order delivery of data from sender to receiver.

The TCP protocol also uses a network congestion avoidance algorithm in order to achieve congestion avoidance. A number of such algorithms exists and can be used. In general, according to some algorithms, the TCP protocol specifies a maximum segment size (MSS). The sender maintains a congestion window, limiting the total number of unacknowledged packets that may be in transit end-to-end. To avoid congestion collapse, TCP makes a slow start when the connection is initialized and after a timeout. It starts with a window of 2 MSS. Although the initial rate is low, the rate of increase is very rapid: for every packet ACKed, the congestion window increases by 1 MSS so that for every round trip time, the congestion window has doubled. When the congestion window exceeds a threshold, or a packet is lost, the algorithm enters a new state, called congestion avoidance. As long as non-duplicate ACKs are received, the congestion window is additively increased by one MSS every round trip time. When a packet is lost, duplicate ACKs will be received. The congestion window is reduced to 1 MSS on a timeout event.

The session proxy module 54, as explained further below, may act as a TCP proxy for all TCP sessions going through the mobile router 12. That way, according to various embodiments as described below, all end-user traffic between the end-user mobile device 16 and the destination (e.g., a server connected to the Internet or other network 18) may be transparently routed through the mobile router 12. Of course, in other embodiments, the local and backhaul wireless links 14, 22 may use a different transport protocol, and, in such embodiments, the session proxy module 54 may similarly act as a proxy for such other transport protocol sessions.

The serial port data publisher module 56 may make data received from a serial device 36, connected to a serial port 38 of the mobile router 12, available from the mobile router 12 via a TCP stream (or any other type of data stream available from the mobile router 12).

Other, conventional components of a router, such as a memory controller, are not illustrated in FIG. 2 for the sake of convenience.

As mentioned before, the link monitor module 52 may monitor the mobile router's layer 2 (data link or cellular layer) and layer 3 (IP or network layer) links with the backhaul network 20. That way, when the link monitor module 52 detects a drop-off, the link monitor module 52 can reestablish the link as quickly as possible in order to minimize the interruption in service to the end user. For example, in typical present-day mobile computing scenarios, when the network drops off, the end-user's applications and network sessions are ordinarily terminated. Consequently, the user has to restart the applications and/or session when the network connection is reestablished. Moreover, it typically is not predictable when the network connection will be reestablished.

The link monitor module 52 overcomes these drawbacks by monitoring the layer 2 and 3 links, and reestablishing the connections when connectivity is lost. As explained in more detail below, the link monitor module 52 may do this by sending and monitoring test (or probing) data packets over the backhaul wireless communication link 22. When it detects a failure in one or both of the links, the link monitor module 52 can take remedial action, such as attempting to reestablish the link. It may reestablish the link before applications on the mobile device 16 have to be restarted. That way, the user does not have to restart his/her applications or sessions. The user just typically notices that the applications/sessions slowed for a brief period of time while the connection was being reestablished.

The link monitor module 52 may utilize adaptive programming according to various embodiments. That is, for example, if the backhaul network interface 44 is receiving packets over the backhaul wireless communication link 22, the link monitor module 52 may send less probing packets and, conversely, if the interface 44 is not receiving packets the link monitor module 52 may send more probing packets. By monitoring packets coming in on the interface 44, the link monitor module 52 may draw the assumption that the interface is functioning. This means that the link monitor module 52 does not have to send test packets across the backhaul wireless communication link 22 to verify connectivity (and hence not wasting precious network resources). However, just because the link monitor module 52 may assume that the interface 44 is functioning does not mean that the link monitor module 52 does not send test packets; it may just send them less frequently in certain embodiments.

The link monitor module 52 may monitor the interface 44 to see if it is receiving data packets. If it is not, then the link monitor module 52 may sleep "A" number of seconds and then proceed to the next step of doing an active probe. If the interface 44 is receiving packets, the link monitor module 52 may then sleep longer (e.g., 10.times.A seconds) before it proceeds to the next step of doing an active probe. So if the backhaul wireless communication link 22 looks like it is working, then the link monitor module 52 may send fewer active probes on the backhaul network 20.

The remote devices that the link monitor module 52 is to monitor may be configured to allow the link monitor module 52 to ensure whether the link to the particular remote device is available. For example, links to the default route, domain name server (DNS), and/or authentication server 19 (see FIG. 1) may be monitored, as well as any device other device on the Internet so configured.

Figure 3:
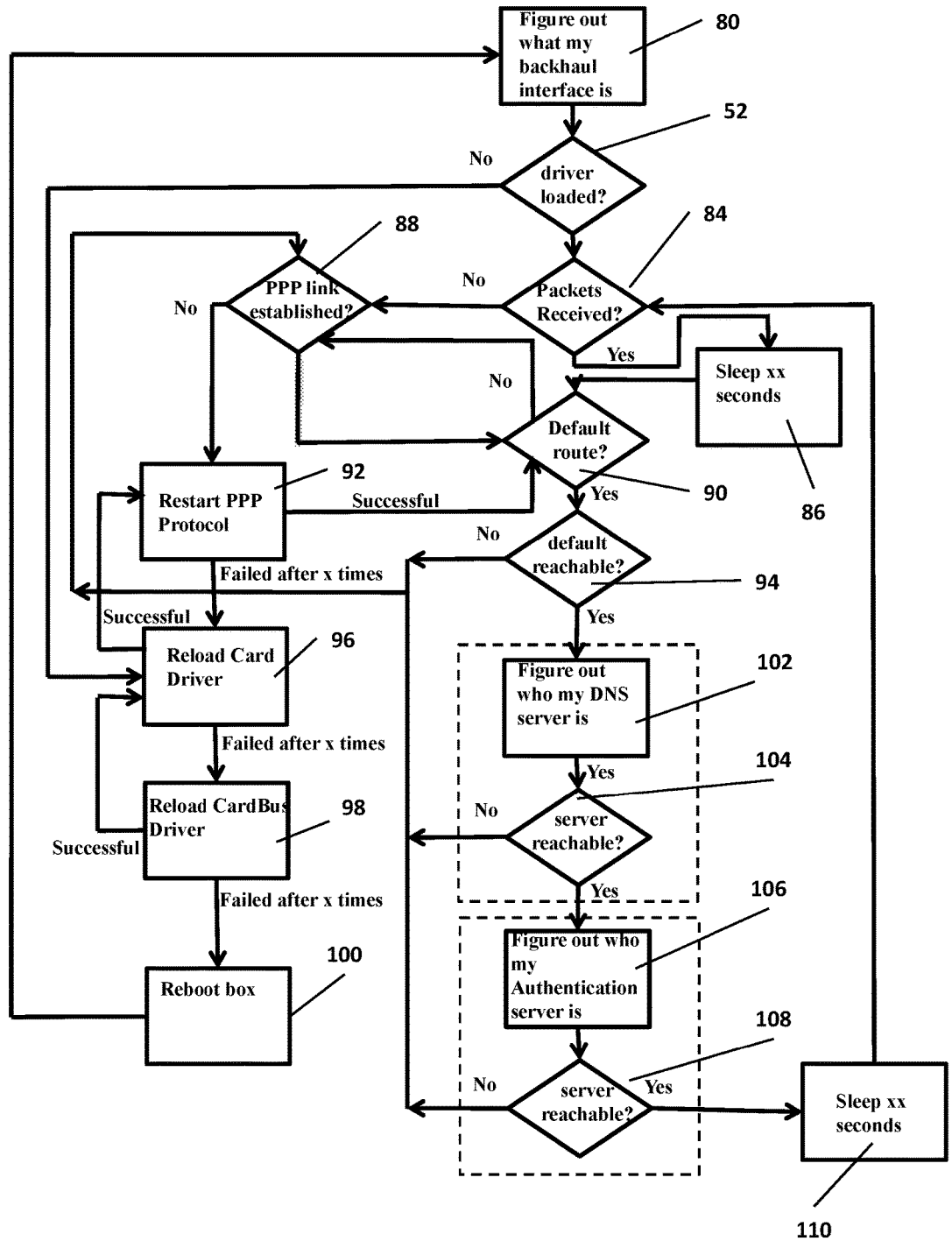
FIG. 3 is a block diagram of the process flow of the link monitor module of the mobile router according to various embodiments of the present invention.

FIG. 3 is a flow chart of the process flow of the link monitor module 52 according to various embodiments of the present invention. This process may be continually running in the background to monitor the layer 2 and layer 3 links on the backhaul wireless communication link 22 of the mobile router 12.

At block 80, the link monitor module 52 may determine what its backhaul network 20 is (e.g. whether it is a GSM/GPRS network interface, a UTMS network interface, etc.). Next, at block 82, the link monitor module 52 may determine if the appropriate backhaul network driver is loaded. If not, at block 96, the driver is reloaded and, if successful, the process returns to block 92 (described further below). If at block 82 it is determined that the driver is loaded, the process advances to block 84, where the link monitor module 52 determines whether packets are being received on the backhaul network interface 44. This is a check of its layer 3—or network layer—status (OCI Model). If so, the process advances to block 86, where the link monitor module 52 goes into sleep mode for a brief period of time (xx seconds) because the network connection is active.

If at block 84 it is determined that packets are not being received over the backhaul wireless connection 22, the process advances to block 88, where the link monitor module 52 may determine if the layer 2, or data link layer, is established with a particular remote device (e.g., a device that is part of the communications network 32 or connected to the Internet 18). In one embodiment, the point-to-point protocol ("PPP") may be used for the layer 2 link (OCI Model). PPP is a protocol used to establish a direct connection between two nodes and is described by described by Internet Engineering Task Force (IETF) RFC 1661. Thus, at block 88, the link monitor module 52 may determine of the PPP link is established. Of course, in other embodiment, a different direct link protocol could be used.

If the PPP link is not established, the process may advance to block 92, where the PPP is restarted to establish the PPP link to the remote device. If that operation is successful, or if at block 88 it is determined that the PPP link is established, the process advances to block 90 where the link monitor module 52 determines if it has a default route to the remote device. In routing technology, a default route, also sometimes called a "gateway of last resort," is the network route used by a router when no other known route exists for a given data packet's destination address. All the packets for destinations not known by the router's routing table are sent to the default route. This route generally leads to another router, which treats the packet the same way. If the route is known, the packet will get forwarded to the known route. If not, the packet is forwarded to the default-route of the router which generally leads to another router, and so on. Once the router with a known route to a host destination is reached, the router determines which route is valid by finding the most specific match. The network with the longest subnet mask that matches the destination IP address wins.

Hence, the default route may be a connection to the remote device that is different from the direct connection. If there is a default route, the process may advance to block 94, where the link monitor module 52 may determine whether the remote device is reachable via the default route. If, at block 90 it is determined that there is no default route, the process may return to block 88 where the PPP link is attempted to be established.

The process also advances to block 90 from block 86 after the brief sleep period. If at block 90 it is determined that the mobile router 12 has a default route, the process advances to block 94 where the link monitor module 52 determines if the default route is reachable. If the default route is not reachable, the process returns to block 88, wherein the PPP link is attempted to be reestablished.

If at block 92 the PPP protocol is unable to be restarted after x number of attempts, the process advances to block 96, where the card driver for the backhaul network interface 44 is reloaded. If at block 66 the card driver is not successfully loaded after a number ("x") of attempts, the process advances to block 98, where the link monitor module 52 attempts to reload the CardBus driver (or other similar driver for mobile routers that do not use CardBus). A CardBus is PCMCIA (Personal Computer Memory Card International Association) 5.0 or later (e.g., JEIDA 4.2 or later) 32-bit PCMCIA card. CardBus is effectively a 32-bit, 33 MHz PCI (Peripheral Component Interconnect) bus in the PC card form factor. CardBus includes bus mastering, which allows a controller on the bus to talk to other devices or memory without going through the CPU.

If that process is successful, the process returns to block 96, where the card driver is again attempted to be reloaded. If at block 98 attempts are unsuccessful in reloading the CardBus driver (or other similar driver), the process, according to various embodiments, advances to block 100, wherein the mobile router 12 is rebooted. From there, the process may return back to block 80.

Returning to block 94, where it is determined if the default route is reachable, if it is not available, the process may advance, according to various embodiments, to block 102, where the domain name server (DNS) for the mobile router is determined. Then, at block 104, it is determined whether the DNS is reachable. If it is, according to various embodiments, at block 106, the authentication server 19 (see FIG. 1) for the mobile router 12 is determined. Then, at block 108, it is determined whether the authentication server 19 is reachable. If so, the process advances to block 110, where the link monitor module 52 enters brief sleep mode, during which no test packets are sent. After the brief sleep, the process returns to block 84 for a re-check of the layer 3 link.

If the DNS server is not reachable at block 104 or if the authentication server is not reachable at block 108, the process returns to block 88, where the PPP link (layer 2 link) is assessed, as explained above.

Some parameters in the process may be configurable. For example, certain time periods used by the various timers may be configurable. The parameters may be factory configurable, remotely configurable over a network, and/or self-adapting. In addition, in various embodiments, the user may be able to configure certain parameters.

In addition, the process can be fine-tuned and optimized for a particular backhaul network and/or usage pattern. The objective of the tuning and optimization may be to deliver the highest data throughput, fastest network drop-off detections, and fastest network reconnection. For example, the targets being probed can be changed. For example, the mobile router 12 may probe the session manager 29 in a network operations center (NOC) 30 (see FIG. 1), or other devices connected to the network 18. Also, rather than active probing, the mobile router 12 may only listen to the backhaul network interface 44. This latter approach may be advantageous when the network 18 is a WAN (or other type of network) with low bandwidth.

The point-to-point protocol ("PPP") startup script may execute continuously until it makes a successful connection. The failure that is shown in FIG. 3 at block 88 is if the PPP startup script is not successful in communicating with the backhaul network card x number of times. If the PPP startup script cannot make a connection it likely is because the mobile router 12 is out of coverage and not because it or the network failed. However, if PPP connection is unable to be established after a relatively long duration (e.g., over one hour), the link monitor module 52 may proceed with the failure path (step 92).

A common problem experienced in the prior art by cellular network users is that the data connection is sometimes lost. When this occurs, applications running on the mobile device (that is connected to the cellular network) stop running, and have to be restarted when the TCP session is re-established.

This problem can be overcome by the session proxy module 54 of the mobile router 12. Returning to FIG. 2, the session proxy module 54 may act as a session proxy for all sessions (e.g., TCP sessions) going through the mobile router 12. That is, for example, when a local end-user seeks to establish a TCP session from their local end-user device (such as the mobile device 14 FIG. 1) with a destination (such as a third party server 26 connected to the network 18, see FIG. 1), the session proxy module 54 may terminate the TCP session coming from the mobile device 16 and, instead, establish a TCP (or some other protocol) session on the backhaul network interface 26 with the destination 26. The mobile router 12 may also maintain a separate TCP session with the mobile device 16 over the local wireless communication link 14. That way, all end-user traffic between the end-user and the destination may be transparently routed through the mobile router 12 on the two separate sessions. That way, one session going down (such as the backhaul wireless communication link 22) need not negatively affect the other session (such as the session between the mobile router 22 and the mobile device 16).

By doing this, several benefits may be achieved. For example, when the backhaul network link 22 goes down (which is sometimes not uncommon for cellular networks), the session proxy module 54 can maintain a TCP session to the local end user (e.g., at the mobile device 16). That way, if applications running on the mobile device 16 are dependent upon a TCP session, the applications may continue to run because there is a TCP session with the mobile router 12, even though the TCP session over the backhaul wireless communication link 22 is lost. When the backhaul network communication link 22 comes back, the end-user may be able to keep running its applications and session without having to restart the applications.

Another potential benefit is that when the backhaul network link 22 goes down, the session proxy module 54 can prevent the TCP session for the link to the mobile device 16 from starting its back-off timers. This is advantageous because, under the TCP protocol, the mobile device 16 would normally assume that it cannot forward packets because of network congestion and it would accordingly start to slow down the user's session. In contrast, with the session proxy module 54 maintaining a TCP session between the mobile router 12 and the mobile device 16, the mobile 16 device would not assume that network congestion is a problem and the TCP session between mobile router 12 and the mobile device 16 the should not slow down.

Another potential benefit is that the TCP timers and congestion windows can be adjusted dynamically so that the link is optimized for the particular characteristics of the backhaul network (e.g., packet loss, latency jitter, etc.). For example, if the network has a high packet loss, the MTU (maximum transmission unit) may be made smaller to increase the likelihood that sent data packets will successfully reach their destination. "MTU" refers to the size (in bytes) of the largest data packet that a given layer of a communications protocol can pass onwards. Alternatively, if the network has relatively little packet loss and high throughput, the MTU may be increased so as to further increase throughput.

In another embodiment, instead of a TCP session, the session proxy module 54 could establish a different type of protocol session with the user's destination that is designed to run over high latency links. Such high-latency links may be HS-TCP (High Speed TCP) or SCPS (Space Communications Protocol Specifications). HS-TCP uses a new congestion control algorithm for TCP that is described in RFC 3649. The SCPS is set of extensions to existing protocols and new protocols developed by the Consultative Committee for Space Data Systems (CCSDS). The SCPS protocol is defined in ISO Standards 15894 (file transfer), 15893 (transport layer), 15892 (security layer) and 15891 (network layer).

In such an embodiment, therefore, there may be a TCP session between the mobile device 16 and the mobile router 12 over the local wireless communication link 14, and a separate high latency protocol session (e.g., HS-TCP or SCPS) between the mobile router 12 and the destination over the backhaul network 20. Moreover, the establishment of the high-latency link on the backhaul network 20 may be done transparently to the local end-user by the session proxy module 54.

In addition, in various embodiments, the local end-user could be given the option of disabling the session proxy module 54. A user of the mobile device 16 may disable the session proxy module 54, for example, through a control panel for the mobile router 12 displayed on the mobile device. Also, the mobile router 12 may have a switch or push-button that allows a user to disable the session proxy module 54. It may be desirable for a user to disable the session proxy module 54 when the user wants to maintain a TCP session with the destination. For example, certain types of virtual private networks (VPNs), such as IPSEC VPNs, encrypt the TCP headers. IPSEC (IP security) is a suite of protocols for securing Internet Protocol (IP) communications by authenticating and/or encrypting each IP packet in a data stream. If the TCP headers were encrypted, the session proxy module 54 would ordinarily not be able to decrypt the headers of the TCP data packets and, therefore, could not appropriately transmit the packets on a non-TCP session. In such a circumstance, the user may desire to disable the session proxy module 54. Other types of VPNs, however, such as secure sockets layer (SSL) VPNs, do not encrypt the TCP headers, so the local end-user may not want or need to disable the session proxy module 54 when such a SSL VPN is being used.

Referring to FIG. 2, the serial port data publisher module 56 may take data received from the serial device 36 connected to the serial port 38 of the mobile router 12 and make the data available via a TCP stream (or some other type of data stream, such as HS-TCP or SCPS data stream). The serial port data publisher module 56 and, via the backhaul network 20 and Internet 18, populate a remote database 25 with the data from the device 36. That way, the data from the serial device 36 can be remotely accessed via the Internet 18.

The serial device 36 may communicate with the mobile router 12 using any suitable serial data protocol, including the USB (Universal Serial Bus) standard, the RS-232 standard, the RS-485 standard, or the IEEE 1394 (FireWire) standard, for example.

The serial device 36 may be any suitable type of serial device, such as, for example, a GPS receiver. In an embodiment where the serial device 36 is a GPS receiver, this allows the location data for the GPS receiver (and hence the location data for the mobile router 12) to be remotely accessible by others. In an application where the mobile router 12 is installed in a mobile vehicle such as a car or truck, such location data could be used for a variety of applications, including:

a company could access the database 25 to determine the current location of its vehicles;

a company could determine and analyze where its vehicles have been, including such things as determining time spent in traffic jams, loading docks, etc.;

track a stolen vehicle;

determining optimal routes for delivery companies;

collection of real-time traffic data, which can be analyzed and/or shared with traffic condition publication services; or collection of historical traffic data, which could be used for traffic planning purposes.

In various embodiments, the stream produced by the serial port data publisher module 56 may be compliant with a protocol standard, such as the RFC 2217 "Telnet Com Port Control Option" protocol, so that end-user devices that support the standard could use the data. This may be useful for Windows-based computers, because such computers could use standard, off-the-shelf mapping applications with a GPS device to be attached to the local machine. The end-user could install a RFC 2217 compliant driver on their Windows computer and could make the GPS data from the mobile router 12 appear as local GPS data on their Windows computer. And since the GPS data from the mobile router 12 would be accessible over an IP network (e.g., the Internet 18), the remote user's Windows computer could access the data from anywhere on the Internet.

The above-described examples were based on a GPS device as the serial device 36 connected to the mobile router 12. It should be recognized that other types of serial data devices 36 may be used and similar data publication processes could be used for such serial data devices so that the data from the serial device may be accessed via the Internet (or other network) 18. For example, in other embodiments the serial device 36 may be a vehicle telematics device. Such a vehicle telematics device may capture data regarding the performance and operation of the vehicle (e.g., diagnostic data) in which the device is installed. Such data may then be published by the mobile router 12 and stored in the database 25, for example, such that it is accessible by third parties via the Internet 18.

In another embodiment, the serial device 36 may be a point-of-sale (POS) device that captures sale or payment information. That way, the POS data may be published to the database 25 such that it is accessible via the Internet 18.

In other embodiments, the serial data device 36 could be, for example, a remote control for an in-car entertainment system (e.g., downloading music, video, games, etc., to third party systems) or a device for interfacing to existing communication systems (e.g., police radios, etc.).

In addition, rather than transmitting the data to a central server (e.g., database 25), a remote user could access the mobile router 12 to access the data from the serial device 36 directly. For example, in one embodiment, an authenticated remote user could access an authentication server 23 (see FIG. 1) to determine the address of the mobile router 12. The remote user could then use that address to communicate with the mobile router 12 directly. Similarly, a local end-user of the mobile router 12 could access the data from the serial device via the local wireless network 14.

Additionally, according to various embodiments, the serial interface 38 of the mobile router 12 can be used to output data/command signals to the connected serial device 36. For example, from a remote location a signal/message can be sent to the mobile router 12 in order to have the signal/message sent output by the serial port 38 to the serial device, where the signal/message causes the serial device 36 to take some sort of action. For instance, the signal/message may activate the serial device 36. For example, where the mobile router 12 is installed in a car, the serial device 36 may be device capable of controlling components and/or systems of the car. For example, the serial device 36 may be able to shut of the engine (such as in the case of theft), unlock the doors in case of inadvertent locking, activate alarm functions, etc. The serial device 36 may also, according to various embodiments, perform payment functions, download data, receive advertising, entertainment, gaming, and/or information, as well as perform network management and control.

While various embodiments of the present invention have been described herein, it should be recognized that other modifications, substitutions and alternatives may be apparent to one of ordinary skill in the art. For example, certain of the steps of FIG. 3 may be performed in different order or simultaneously. Such modifications, substitutions and alternatives can be made without departing from the spirit and scope of the invention.

The invention claimed is:

1. A non-transitory computer readable medium with computer executable instructions stored thereon executed by a processor in a vehicle comprising a wireless local area network interface to communicate with a mobile device via a local wireless network and a backhaul network interface to wirelessly communicate with a backhaul network and to establish a layer 2 communication link and a layer 3 communication link to provide a link monitoring communication method, the method comprising:
   monitoring said layer 2 communication link and said layer 3 communication link over said backhaul network interface;
   reestablishing communications via said layer 2 communication link and said layer 3 communication link when a communications failure via said layer 2 communications link is detected; and
   reestablishing communications via said layer 3 communication link when a communications failure via only said layer 3 communication link is detected.

2. The non-transitory computer readable medium with computer executable instructions stored thereon in accordance with claim 1, wherein said method comprises:
   sending data test packets to a destination device over said backhaul network.

3. The non-transitory computer readable medium with computer executable instructions stored thereon in accordance with claim 2, wherein said method comprises: adapting the frequency at which said test packets are sent to said destination device based on whether communication with said backhaul network is active.

4. The non-transitory computer readable medium with computer executable instructions stored thereon in accordance with claim 2, wherein said method comprises:
   sending said test packets to said destination device less frequently when the network connection to said backhaul network is active.

5. The non-transitory computer readable medium with computer executable instructions stored thereon in accordance with claim 1, wherein:
   said local wireless network comprises one of a wireless fidelity (Wi-Fi) network and a Worldwide Interoperability for Microwave Access (Wi-MAX) network.

6. The non-transitory computer readable medium with computer executable instructions stored thereon in accordance with claim 1, wherein:
   said backhaul network comprises a cellular network.

7. The non-transitory computer readable medium with computer executable instructions stored thereon in accordance with claim 6, wherein:
   said cellular network comprises one of a Global System for Mobile Communications (GSM)/General Packet Radio Service (GPRS) network and a Universal Mobile Telecommunications System (UMTS) network.

8. The non-transitory computer readable medium with computer executable instructions stored thereon in accordance with claim 6, wherein:
   said local wireless network comprises one of a wireless fidelity (Wi-Fi) network and a Worldwide interoperability for Microwave Access (Wi-MAX) network.

9. The non-transitory computer readable medium with computer executable instructions stored thereon in accordance with claim 1, wherein:
   said mobile device is a wireless-enabled computer comprising one of a laptop equipped with a wireless network interface card, a wireless-enabled Personal Digital Assistant PDA, a pocket computer, a wireless fidelity (Wi-Fi) phone, a wireless fidelity (Wi-Fi) appliance, a portable, network-enabled gaming station, a video screen, a digital camera, an audio player, a navigation device, a security camera, an alarm device, a wireless payment device, and a wireless Point of Service (POS) device.

10. The non-transitory computer readable medium with computer executable instructions stored thereon in accordance with claim 1, wherein:
    said processor is housed in a mobile router is installed in said vehicle.

11. The non-transitory computer readable medium with computer executable instructions stored thereon in accordance with claim 10, wherein:
    the vehicle is a vehicle selected from the group consisting of an automobile, a truck, a rail car, a bus, and a boat.

12. A computer-program product for providing a communication mode of operation of a vehicle, said vehicle comprising a local network interface to wirelessly communicate with a mobile device via a local wireless network, a backhaul network interface to wirelessly communicate with a backhaul network via a layer 2 communication link and a layer 3 communication link, and a processor in communication with said local network interface and said backhaul network interface, said product comprising a non-transitory computer-readable medium encoded with computer-executable instructions that, as a result of being executed by said processor disposed within a vehicle, said processor executes a method for providing a communication mode, the method comprising:

monitoring said layer 2 communication link and said layer 3 communication link;

reestablishing said layer 2 communication link and said layer 3 communication link when a layer 2 communication link failure is detected; and reestablishing said layer 3 communication link when a layer 3 communication link failure is detected.

13. The computer-program product of claim 12, comprising:

sending test data packets to a destination device via said backhaul network interface; and monitoring for receipt of responses to said test packets from said destination device.

14. The computer-program product of claim 13, comprising:

monitoring said backhaul network interface to detect receipt of data packets over said level 2 communication link and said level 3 communication link to determine that said level 2 and level 3 communication links are active or inactive; and adapting the frequency at which said test data packets are sent to said destination device based on whether said level 2 and level 3 communication links are active or inactive.

15. The computer-program product of claim 13, wherein:

said local wireless network comprises one of a wireless fidelity (Wi-Fi) network and a Worldwide Interoperability for Microwave Access (Wi-MAX) network; and said backhaul network comprises a cellular network comprising one of a Global System for Mobile Communications (GSM)/General Packet Radio Service (GPRS) network and a Universal Mobile Telecommunications System (UMTS) network.

16. The computer-program product of claim 13, wherein:

said vehicle is one of an automobile, a truck, a rail car, a bus, and a watercraft.

* * * * *

UNITED STATES PATENT AND TRADEMARK OFFICE
CERTIFICATE OF CORRECTION

PATENT NO. : 10,104,711 B2  
APPLICATION NO. : 15/437847  
DATED : October 16, 2018  
INVENTOR(S) : Douglas S Moeller Page 1 of 1

It is certified that error appears in the above-identified patent and that said Letters Patent is hereby corrected as shown below:

On the Title Page

Related U.S. Application Data should read:
Related U.S. Application Data
(63) Continuation of application No. 15/180,304 filed on Jun. 13, 2016, now Pat. No. 9,578,672, which is a continuation of application No. 14/448,810 filed on Jul. 31, 2014, now Pat. No. 9,369,552, which is a continuation of application 12/514,047, filed as application No. PCT/US2007/011632 on May 15, 2007, now Pat. No. 8,817,599

(60) Provisional application No. 60/800,749, filed on May 16, 2006, provisional application No. 60/800,679, filed on May 16, 2006, provisional application No. 60/800,750, filed on May 16, 2006.

Signed and Sealed this
Nineteenth Day of February, 2019

Andrei Iancu
*Director of the United States Patent and Trademark Office*